United States Patent
Liu et al.

(10) Patent No.: US 10,811,963 B2
(45) Date of Patent: Oct. 20, 2020

(54) MULTI-STAGE CHARGE PUMP WITH INTER-STAGE LIMITATION CIRCUIT

(71) Applicant: NXP B.V., Eindhoven (NL)

(72) Inventors: Xiaoqun Liu, Chandler, AZ (US); Madan Mohan Reddy Vemula, Tempe, AZ (US)

(73) Assignee: NXP B.V., Eindhoven (NL)

( * ) Notice: Subject to any disclaimer, the term of this patent is extended or adjusted under 35 U.S.C. 154(b) by 102 days.

(21) Appl. No.: 16/172,381

(22) Filed: Oct. 26, 2018

(65) Prior Publication Data
US 2020/0136503 A1   Apr. 30, 2020

(51) Int. Cl.
H02M 3/07 (2006.01)
H02H 9/02 (2006.01)
H02M 1/32 (2007.01)

(52) U.S. Cl.
CPC ............ *H02M 3/073* (2013.01); *H02H 9/025* (2013.01); *H02M 1/32* (2013.01); *H02M 2003/075* (2013.01)

(58) Field of Classification Search
None
See application file for complete search history.

(56) References Cited

U.S. PATENT DOCUMENTS

| | | | | |
|---|---|---|---|---|
| 5,841,703 A * | 11/1998 | Wojciechowski | ..... | G11C 5/145 365/189.09 |
| 7,595,682 B2 * | 9/2009 | Lin | ........ | H02M 3/073 327/536 |
| 2004/0047189 A1 * | 3/2004 | Tran | ..... | G11C 11/5642 365/200 |
| 2013/0093503 A1 * | 4/2013 | Kok | ........ | H02M 3/07 327/536 |

OTHER PUBLICATIONS

Abdi, Alfian et al., "A High-Voltage Generation Charge-Pump IC using Input Voltage Modulated Regulation for Neural Implant Devices", IEEE Transactions on Circuits and Systems II—Express Briefs, 5 pages. (2018 Early Access).
Allasasmeh, Younis et al., "Fast-Startup High-Efficiency Tripler Charge Pump in Standard 0.18-μm CMOS Technology", IEEE International Symposium on Circuits and Systems, pp. 1-5. (2018).

\* cited by examiner

*Primary Examiner* — Cassandra F Cox

(57) ABSTRACT

A multi-stage charge pump circuit including a first stage of the multi-stage charge pump having a first voltage output, a last stage of the multi-stage charge pump having a first voltage input, and an inter-stage limitation circuit configured to protect a voltage drop of the first voltage output of the first stage of the multi-stage charge pump when there is a voltage drop on the first voltage input of the last stage of the multi-stage charge pump.

18 Claims, 1 Drawing Sheet

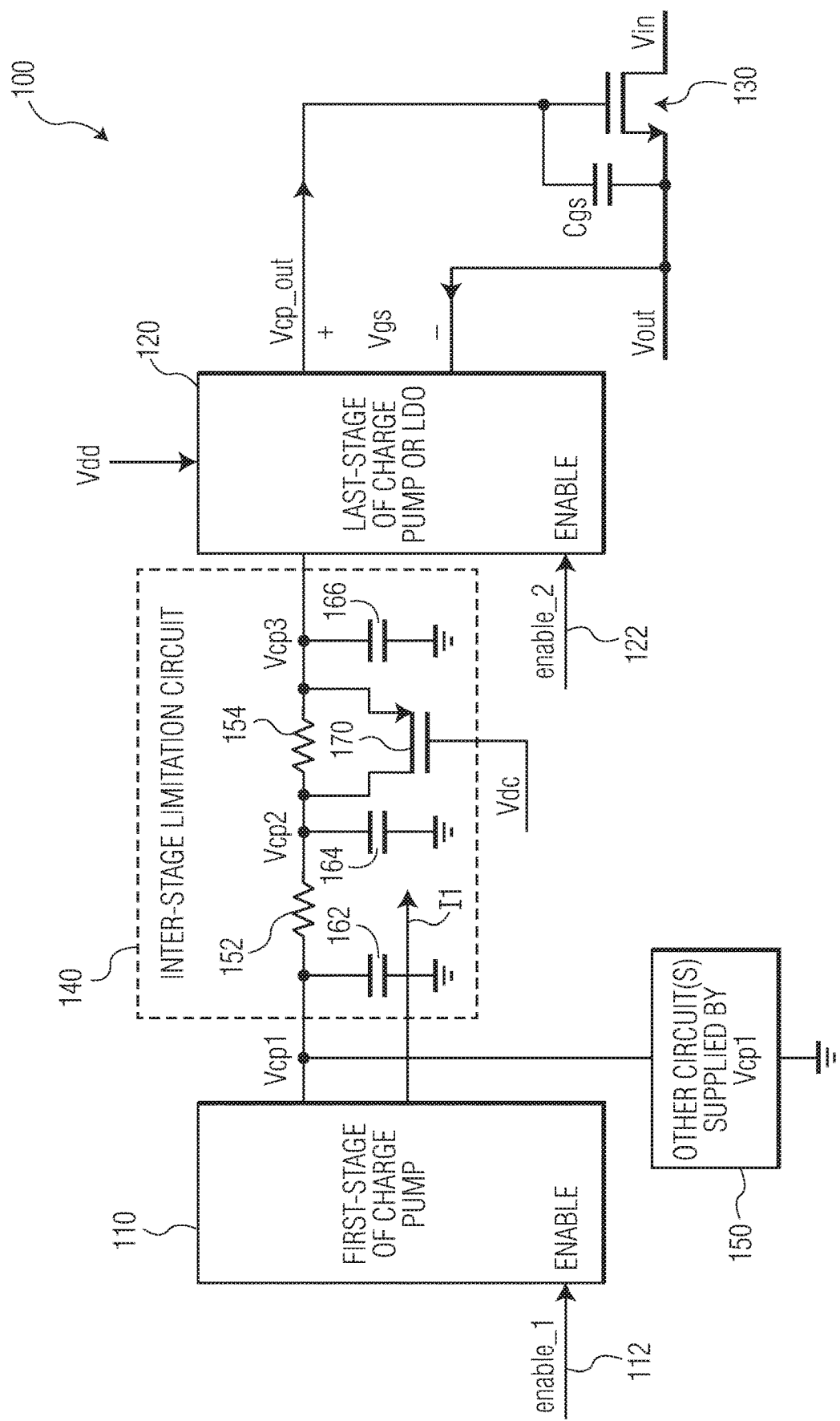

MULTI-STAGE CHARGE PUMP WITH INTER-STAGE LIMITATION CIRCUIT

TECHNICAL FIELD

Example embodiments disclosed herein relate generally to a multi-stage charge pump circuit, and more particularly to a multi-stage charge pump circuit having an inter-stage current limitation circuit.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

Example embodiments include a multi-stage charge pump circuit including a first stage of the multi-stage charge pump having a first voltage output, a last stage of the multi-stage charge pump having a first voltage input, and an inter-stage limitation circuit configured to protect a voltage drop of the first voltage output of the first stage of the multi-stage charge pump when there is a voltage drop on the first voltage input of the last stage of the multi-stage charge pump.

The first voltage output of the first stage of the multi-stage charge pump may connect to the first voltage input of the last stage of the multi-stage charge pump through the inter-stage limitation circuit.

The inter-stage limitation circuit may include a PMOS transistor in parallel with a large size resistor.

The PMOS transistor may be configured to be ON during a steady state action of the multi-stage charge pump.

The PMOS transistor may be configured to be OFF when the first voltage input drops from a high state to a low state.

The inter-stage limitation circuit may include a first storage capacitor associated with the first voltage output.

The inter-stage limitation circuit may include a second storage capacitor associated with the first voltage input.

The first voltage output may be configured to provide power to other circuits external to the multi-stage charge pump.

The inter-stage limitation circuit may include a small size resistor in series with a large size resistor. The multi-stage charge pump circuit may include an intermediary capacitor disposed between the small size resistor and the large size resistor.

Example embodiments also include an inter-stage limitation circuit, including a first capacitor to receive a charge from a first stage of a multi-stage charge pump, a small size resistor to pass a current stored in the first capacitor, a second capacitor to store a charge associated with a last stage of the multi-stage charge pump, an intermediate capacitor to store an intermediate charge between the first capacitor and the second capacitor, a example embodiments large size resistor in series with the small size resistor; and a PMOS transistor in parallel with the large size resistor, wherein the PMOS transistor is in an OFF state to enable the large size resistor and limit the current through the inter-stage limitation circuit.

The first capacitor, second capacitor, and intermediate capacitor may be arranged in parallel.

Example embodiments also include a method of operating a multi-stage charge pump including ramping up a first voltage output of a first-stage charge pump, ramping up a second voltage output of a last-stage charge pump in order to supply a voltage of an external switch, limiting a current draw on the first voltage output by enabling a high resistance between the first voltage output of the first-stage charge pump and a first voltage input of the last-stage charge pump.

The method may include switching off a PMOS transistor that is in parallel with the high resistance to enable the high resistance between the first stage and the last stage.

The method may include switching on a PMOS transistor that is in parallel with the high resistance to disable the high resistance between the first stage and the last stage.

The first voltage output may be configured to provide power to other circuits.

The method may include storing a first charge in a first capacitor adjacent an output of the first stage.

The method may include storing a second charge in an intermediate capacitor between the first stage and the last stage.

The method may include storing a second charge in a second capacitor adjacent an input of the last stage.

The method may include storing and ramping up charge using a plurality of capacitors arranged in parallel.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the FIGURES, in which:

FIG. 1 illustrates a multi-stage charge pump 100 configured to power a switch in accordance with example embodiments described herein.

DETAILED DESCRIPTION

It should be understood that the figures are merely schematic and are not drawn to scale. It should also be understood that the same reference numerals are used throughout the FIGURES to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

As described herein, a plurality of charge pumps are included in a multiple stage charge pump and are connected in series, with the output of one stage connected to the input of another stage. Depending upon a desired output voltage, a varied number of charge pumps stages may be used and enabled.

In a power delivery system or data communication system, multi-stage charge pumps may be used, and charge pump outputs are shared to bias gate-source voltages of either power switches or data switches. The power or data switches may use NMOS transistors. These NMOS transistor switches may be in an ON or OFF state independently of when the multi-stage charge pump is ON. Depending on the voltage levels of the delivery power or the data signals passing through the NMOS switches, voltages from different charge pump stage outputs are applied to bias different switches.

FIG. 1 illustrates a multi-stage charge pump 100 configured to power a switch in accordance with example embodiments described herein. The multi-stage charge pump 100 includes a first stage 110, a last stage 120 and intermediate stages (not illustrated) between the first stage 110 and the last stage 120. A supply voltage Vdd is applied to power the first stage 110 and the last stage 120. Enable signals 112 and 122 are used to select the first stage 110 and/or last stage 120 when output voltages are respectively requested therefrom. Output of the first stage 110 of the multi-stage charge pump 100 may be designated Vcp1. Vcp1 may be referred to as a first voltage output of the first stage 110 of the multi-stage charge pump 100. The first stage 110 and any intermediate stages contribute to the last stage to produce the multi-stage output Vcp_out. The output Vcp_out may be referred to as a second voltage output. The first stage 110 may also be designed as a LDO (low-drop-out) voltage regulator. The last stage 120 may also be designed as a LDO (low-drop-out) voltage regulator. The first stage 110, last stage 120, and intermediate stages (not illustrated) may also be designed as LDO (low-drop-out) voltage regulators.

The multi-stage charge pump 100 may conclude with a last stage 120. An output from the last stage Vcp_out may be used to control a gate input of a power switch 130. Example embodiments described herein may include a plurality of multi-stage charge pumps 100 to supply power to a plurality of power or data switches 130.

Inputs to the multi-stage charge pump 100 may include another supply or the first stage 110 of the multi-stage charge pump 100. In order to reduce power consumption, the last stage 120 of the multi-stage charge pump 100 that is connected to the power switch 130 may be turned off while the first stage 110 is enabled. An output of the first stage may be designated Vcp1 and stored in a first storage capacitor 162. Other circuits 150 may be connected to and draw power from the first stage 110 output Vcp1. The last stage 120 may have an input voltage Vcp3 that connects to the output voltage Vcp1. Vcp3 may be referred to as a first voltage input of the last stage 120 of the multi-stage charge pump 100. When Vcp_out is requested by the power switch 130, the voltage Vcp3 may drop from a steady state high voltage to a lower voltage. In some designs of charge pumps without an inter-stage limitation circuit as described herein, because the output Vcp1 of the first stage 110 is not an ideal power supply, transient current I1 is pulled from the first storage capacitor 162 of the first stage 110 when the last stage 120 of the multi-stage charge pump 100 is enabled due to a large gate capacitor Cgs of the power switch 130. The first stage 110 and second stage 120 may be under the control of clock signals 114 and 124 that originate from a control circuit (not illustrated).

The transient current I1 is a function of the first stage 110 first storage capacitor 162 and a capacitance Cgs of the power switch 130. The capacitance Cgs of the power switch 130 may be on the order of 1000 pF. The first stage 110 storage capacitor 162 may be on the order of 10 pF to 30 pF due to chip area sizing. Due to the large power switch 130 and a large Cgs of the power switch 130, the transient current I1 drawn from the output Vcp1 by the capacitance Cgs of the power switch 130 may be large and cause a large voltage-drop on the first stage 110 output Vcp1. Without the use of an inter-stage current limitation circuit 140 described herein, this large voltage drop may affect the function of other circuits 150 that are connected to and drawing current from the first stage 110 output Vcp1.

According to example embodiments described herein, the inter-stage current limitation circuit is applied between the first stage 110 and last stage 120 of the multi-stage charge pump 100 to avoid the voltage drop at Vcp1 without affecting a steady state function of the last stage 120. The inter-stage current limitation circuit 140 allows an efficient trade-off between the first stage voltage drop Vcp1 (by current limiting the in-rush current) and start up time for the power switch 130.

In a case when the last-stage 120 is enabled after the first stage 110 is enabled and the first stage 110 output voltage Vcp1 fully ramps up, during the ramping up of the last stage 120 output voltage Vcp_out, excess current I1 pulling from the first stage 110 due to the large power switch 130 gate capacitance Cgs by the last stage 120 is limited by the inter-stage current limitation circuit 140. Therefore, the first stage output Vcp1 may be protected and a large voltage drop on the first stage 110 is avoided.

As illustrated in FIG. 1, the first stage 110 of the multi-stage charge pump 100 may be configured to generate an output voltage Vcp1 according the following equation when it is enabled and when its output voltage fully ramps up, $$Vcp1 = n * Vdd \tag{1}$$

where n is a natural number, and can be 2, or 3, or 4 depending on the design. Vdd is a chip power supply voltage (e.g., Vdd=3V, n=3, and Vcp1 is about 9V). As discussed above, Vcp1 may be used as a voltage power supply for other circuits 150, or bias data switches within the first stage 110 charge pump or LDO regulator.

The inter-stage current limitation circuit 140 is disposed between the output Vcp1 of the first stage 110 and the input Vcp3 of the last stage 120. The last stage 120 generates an output voltage Vcp_out to bias a gate source voltage Vgs of the power switch 130.

Without the inter-stage current limitation circuit 140, the voltage Vcp1 is directly connected to the input Vcp3 of the last stage 120 of the multi-stage charge pump 100. The last stage 120 is enabled after the first stage 110 is enabled and Vcp1 fully ramps up. In this case, during the transient of ramping up of the last stage 120 to generate Vcp_out, the last stage 120 pulls excess current from Vcp1 to charge up the gate-source capacitance Cgs of the power switch 130. Therefore, Vcp3 and hence Vcp1 suffers from a large voltage drop to as low as 2V. This voltage drop negatively affects the functionality of the other circuit(s) 150 that Vcp1 is supplying.

To remedy this fluctuation, the inter-stage current limitation circuit 140 includes components including the first storage capacitor 162, a series resistor 152, an intermediary storage capacitor 164, a large size series resistor 154, a PMOS transistor 170 in series with large size series resistor 154, and a second storage capacitor 166. The intermediary storage capacitor 164 may help store charge from the first stage output Vcp1. During the ramping up of Vcp_out, the capacitor 164 may supply some of the charge. The series resistor may be on the order of 10KΩ. The large series resistor may be on the order of 200KΩ. The PMOS transistor 170 is in parallel arrangement with the large size series resistor 154. Before Vcp_out ramps up, Vcp3 is high, and the PMOS transistor 170 is ON (because the voltage drop from drain to gate is high). The on resistance of the PMOS transistor 170 is small compared to the large size series resistor 154, thus a high current draw is allowed between Vcp1 and Vcp3. During a transient time of Vcp_out ramping up, a large voltage drop occurs at Vcp3. The voltage level at Vcp2 also drops. When Vcp2 drops to Vdc+abs(Vthp), the PMOS transistor 170 is switched off (because the voltage drop from drain to gate is low). Because the large size series resistor 154 is designed to be very large, the voltage Vcp2 is clamped as indicated in the following equation $$V\text{clamp}(Vcp2) > Vdc + \text{abs}(Vthp) \quad (2)$$

where Vthp is the threshold voltage for the PMOS transistor 170 to be turned on, abs(Vthp) is an absolute value because Vthp is a negative value, and Vdc is pre-defined voltage, e.g., $$Vdc = (n-1)*Vdd \quad (3)$$

where Vdd is an input to the first stage 110. Vdc may be output from a previous stage or may be an initial input from a power source.

As discussed, large size series resistor 154 is a very large resistance to limit the current pulling from Vcp2 when the PMOS transistor 170 is off to guarantee that Vcp2 is clamped. Series resistor 152 is a smaller resistance, together with the first storage capacitor 162 to further protect Vcp1. In a steady state when Vcp_out fully ramps up, no excess current is pulled from Vcp3. Vcp3 is charged up and the PMOS transistor 170 is turned on. As noted above, the PMOS transistor 170 may have an on-resistance much smaller than large size series resistor 154, and therefore, when the PMOS transistor 170 is turned on, large size series resistor 154 is by-passed, the resistance from the first stage 110 to the last stage 120 is small, and the steady state function of the multi-stage charge pump 100 is not affected.

In other words, during the transient of Vcp_out ramping up, because the PMOS transistor 170 is off, the inter-stage current limitation circuit 140 becomes a RC low pass filter with a very large RC time constant to protect Vcp1 from the large voltage drop of Vcp3. In steady state, large size series resistor 154 is by-passed by the PMOS transistor 170, and the inter-stage current limitation circuit 140 becomes a RC low pass filter with very small RC time constant when protection is not needed.

As noted above regarding intermediate stage charge pumps, the first stage 110 may be designed as a single stage charge pump when n=2, or multi-stage charge pump 100 when n>2. In another embodiment, the first stage 110 may be dispensed with, and Vcp1 may directly come from the power supply Vdd.

Also the first stage 110 and the last stage 120 can be either an open-loop or close-loop design with the voltage regulator. The voltage regulator may regulate the output voltage of each stage, or regulate a gate-source voltage of switches each stage as biasing.

Example embodiments described herein may be applied to provide reliable first stage or intermediate stage charge pump output voltage and improve reliability of chip functionality.

Although the various example embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and FIGURES are for illustrative purposes only and do not in any way limit the invention, which is defined only by the claims.

The invention claimed is:
1. A multi-stage charge pump circuit, comprising:
a first stage of the multi-stage charge pump having a first voltage output;
a last stage of the multi-stage charge pump having a first voltage input; and
an inter-stage limitation circuit configured to protect a voltage drop of the first voltage output of the first stage of the multi-stage charge pump when there is a voltage drop on the first voltage input of the last stage of the multi-stage charge pump.
2. The multi-stage charge pump circuit of claim 1, wherein the first voltage output of the first stage of the multi-stage charge pump connects to the first voltage input of the last stage of the multi-stage charge pump through the inter-stage limitation circuit.
3. The multi-stage charge pump circuit of claim 1, wherein the inter-stage limitation circuit includes a PMOS transistor in parallel with a large size resistor.
4. The multi-stage charge pump circuit of claim 3, wherein the PMOS transistor is configured to be ON during a steady state action of the multi-stage charge pump.
5. The multi-stage charge pump circuit of claim 3, wherein the PMOS transistor is configured to be OFF when the first voltage input drops from a high state to a low state.
6. The multi-stage charge pump circuit of claim 1, wherein the inter-stage limitation circuit includes a first storage capacitor associated with the first voltage output.
7. The multi-stage charge pump circuit of claim 1, wherein the inter-stage limitation circuit includes a second storage capacitor associated with the first voltage input.
8. The multi-stage charge pump circuit of claim 1, wherein the first voltage output is configured to provide power to other circuits external to the multi-stage charge pump.
9. The multi-stage charge pump circuit of claim 1, wherein the inter-stage limitation circuit includes a small size resistor in series with a large size resistor.
10. The multi-stage charge pump circuit of claim 9, comprising an intermediary capacitor disposed between the small size resistor and the large size resistor.
11. A method of operating a multi-stage charge pump, comprising:
ramping up a first voltage output of a first-stage charge pump;
ramping up a second voltage output of a last-stage charge pump in order to supply a voltage of an external switch;
limiting a current draw on the first voltage output by enabling a high resistance between the first voltage output of the first-stage charge pump and a first voltage input of the last-stage charge pump.

12. The method of claim 11, comprising switching off a PMOS transistor that is in parallel with the high resistance to enable the high resistance between the first stage and the last stage.

13. The method of claim 11, comprising switching on a PMOS transistor that is in parallel with the high resistance to disable the high resistance between the first stage and the last stage.

14. The method of claim 11, wherein the first voltage output is configured to provide power to other circuits.

15. The method of claim 11, comprising storing a first charge in a first capacitor adjacent an output of the first stage.

16. The method of claim 11, comprising storing a second charge in an intermediate capacitor between the first stage and the last stage.

17. The method of claim 11, comprising storing a second charge in a second capacitor adjacent an input of the last stage.

18. The method of claim 11, comprising storing and ramping up charge using a plurality of capacitors arranged in parallel.

* * * * *